US012652638B2

(12) United States Patent
Keating et al.

(10) Patent No.: US 12,652,638 B2
(45) Date of Patent: Jun. 9, 2026

(54) DETERMINING TIMING OFFSET FOR IMPROVED POSITIONING ACCURACY

(71) Applicant: NOKIA TECHNOLOGIES OY, Espoo (FI)

(72) Inventors: Ryan Keating, Chicago, IL (US); Oana-Elena Barbu, Aalborg (DK); Johannes Harrebek, Aalborg (DK); Benny Vejlgaard, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 414 days.

(21) Appl. No.: 18/043,353

(22) PCT Filed: Aug. 27, 2021

(86) PCT No.: PCT/FI2021/050577
§ 371 (c)(1),
(2) Date: Feb. 28, 2023

(87) PCT Pub. No.: WO2022/043614
PCT Pub. Date: Mar. 3, 2022

(65) Prior Publication Data
US 2023/0328682 A1 Oct. 12, 2023

(30) Foreign Application Priority Data
Aug. 31, 2020 (FI) ...................................... 20205843

(51) Int. Cl.
*H04W 64/00* (2009.01)
*H04L 5/00* (2006.01)
(Continued)

(52) U.S. Cl.
CPC ........... *H04W 64/00* (2013.01); *H04L 5/0051* (2013.01); *H04W 16/28* (2013.01); *H04W 56/0015* (2013.01)

(58) Field of Classification Search
CPC . H04W 64/00; H04W 16/28; H04W 56/0015; H04L 5/0051
(Continued)

(56) References Cited

U.S. PATENT DOCUMENTS

2017/0374637 A1* 12/2017 Akkarakaran ........ H04W 24/10
2020/0083965 A1 3/2020 Chui et al.
(Continued)

FOREIGN PATENT DOCUMENTS

EP 3349032 A1 7/2018
WO WO 2016/181197 A1 11/2016
(Continued)

OTHER PUBLICATIONS

Extended European Search Report for European Application No. 21860623.4 dated Aug. 21, 2024, 9 pages.
(Continued)

*Primary Examiner* — Michael R Neff
(74) *Attorney, Agent, or Firm* — ALSTON & BIRD LLP

(57) ABSTRACT

Disclosed is a method comprising selecting a reference point associated with a position of a terminal device (302), determining a timing offset associated with one or more first antenna panels (304), wherein the timing offset is determined based at least partly on the reference point, and applying the timing offset to the one or more first antenna panels (305).

21 Claims, 11 Drawing Sheets

(51) Int. Cl.
   H04W 16/28      (2009.01)
   H04W 56/00      (2009.01)

(58) Field of Classification Search
   USPC ...................................................... 455/456.1
   See application file for complete search history.

(56)                    References Cited

U.S. PATENT DOCUMENTS

2020/0196265 A1    6/2020  Ryu et al.
2021/0168714 A1    6/2021  Guan et al.

FOREIGN PATENT DOCUMENTS

WO     WO 2018/127426 A1     7/2018
WO     WO 2019/076485 A1     4/2019
WO     WO 2020/030010 A1     2/2020
WO     WO 2020/164743 A1     8/2020
WO     WO 2020/167890 A1     8/2020
WO     WO 2021/229026 A1    11/2021

OTHER PUBLICATIONS

"3rd Generation Partnership Project; Technical Specification Group Services and System Aspects; Study on positioning use cases; Stage 1 (Release 16)", 3GPP TR 22.872 v16.1.0, (Sep. 2018), 75 pages.

Ericsson, "Introduction of NR Positioning Support", 3GPP TSG-RAN WG1 Meeting #99, Change Request CR 0029, R1-1913661, (Nov. 18-22, 2019), 11 pages.

Huawei et al., "Correction on the Phase Difference Between Antenna Panels Without Calibration", 3GPP TSG RAN WG1 Meeting #86, Change Request CR 0007, R1-167234, (Aug. 22-26, 2016), 2 pages.

Huawei et al., "Codebook Design for Multi-Panel Structured MIMO in NR", 3GPP TSG-RAN WG1 Meeting #87, R1-1611666, (Nov. 14-18, 2016), 5 pages.

Huawei et al., "NR Positioning Measurements", 3GPP TSG RAN WG1 #97, R1-1906054, (May 13-17, 2019), 15 pages.

Intel Corporation et al., "New WID: NR Positioning Support", 3GPP TSG RAN Meeting #83, RP-190752, (Mar. 18-21, 2019), 6 pages.

InterDigital Communications, "On Type I CSI Feedback for Multi-Panel", 3GPP TSG RAN WG1 Meeting #88, R1-1702328, (Feb. 13-17, 2017), 3 pages.

International Search Report and Written Opinion for Patent Cooperation Treaty Application No. PCT/FI2021/050577 dated Nov. 30, 2021, 17 pages.

Nokia et al., "Views on Potential Positioning Enhancements", 3GPP TSG RAN WG1 #103-e, R1-2008301, (Oct. 16, 2020), 13 pages.

Office Action for Finland U.S. Appl. No. 20/205,843 dated Dec. 27, 2021, 1 page.

Office Action for Finland U.S. Appl. No. 20/205,843 dated Mar. 31, 2021, 9 pages.

Qualcomm Incorporated, "New SID on NR Positioning Enhancements", 3GPP TSG RAN Meeting #86, RP-193237, (Dec. 9-12, 2019), 4 pages.

Yongtao et al., "The Influence of the Nonideal Phase Offset on SAR-Based Localization in Passive UHF RFID", IEEE Transactions on Antennas and Propagation, vol. 68, No. 8, (Aug. 2020), 9 pages.

* cited by examiner

| 301 | Configure UE with SRS-for-positioning |
| 302 | Select reference point |
| 303 | Select SRS-for-positioning transmission panel |
| 304 | Determine panel-specific timing offset |
| 305 | Apply timing offset for non-reference panel |
| 306 | Transmit SRS-for-positioning |

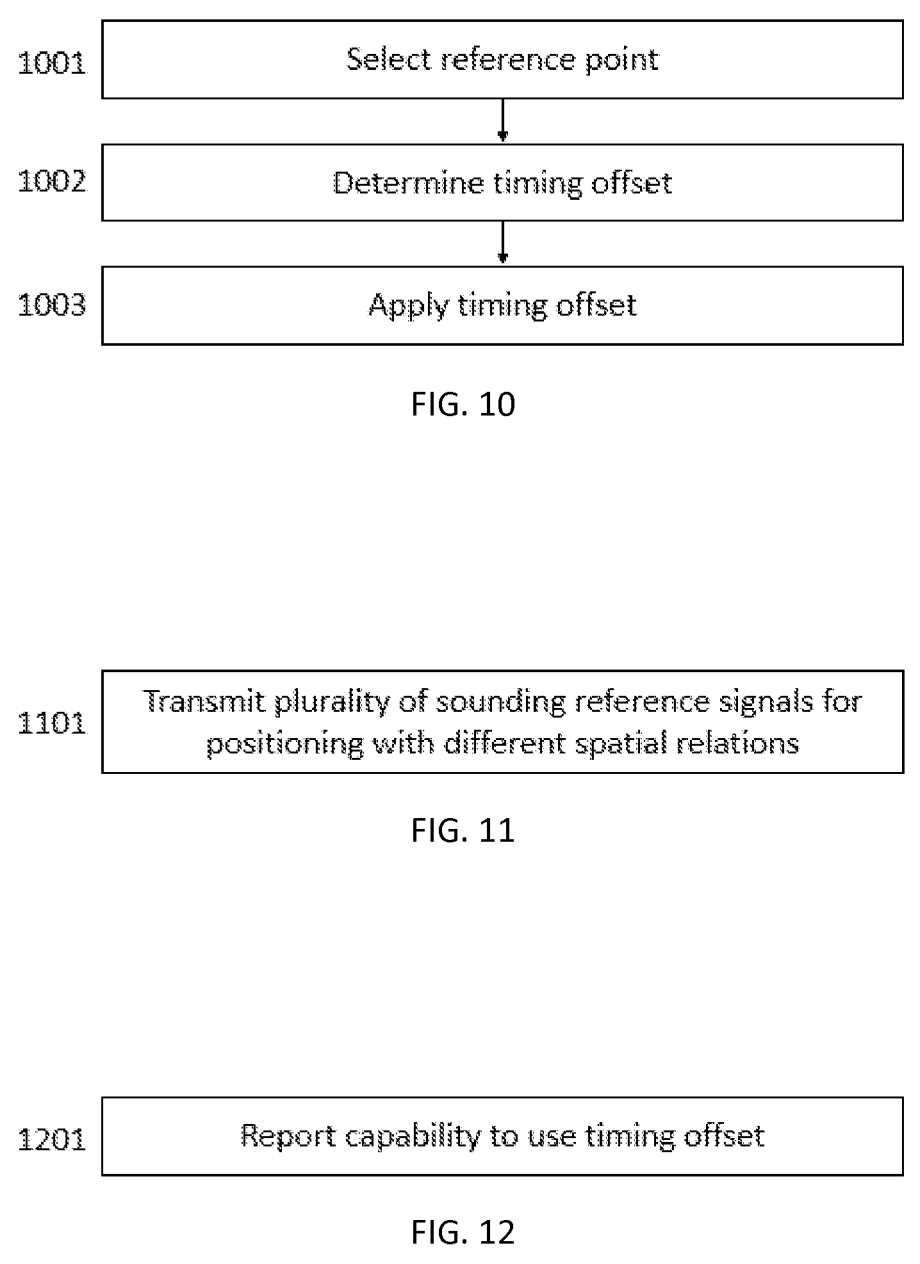

1001 | Select reference point

1002 | Determine timing offset

1003 | Apply timing offset

FIG. 10

1101 | Transmit plurality of sounding reference signals for positioning with different spatial relations

FIG. 11

1201 | Report capability to use timing offset

DETERMINING TIMING OFFSET FOR IMPROVED POSITIONING ACCURACY

CROSS-REFERENCE TO RELATED APPLICATIONS

This application is a national phase entry of International Application No. PCT/FI2021/050577, filed Aug. 27, 2021, which claims priority to Finnish Application No. 20205843, filed Aug. 31, 2020, the contents of which are hereby incorporated by reference in their entirety.

FIELD

The following exemplary embodiments relate to wireless communication.

BACKGROUND

Positioning technologies may be used to estimate a physical location of a device. It is desirable to improve the positioning accuracy for estimating the device location.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: select a reference point associated with a position of the apparatus, determine a timing offset associated with one or more first antenna panels, wherein the timing offset is determined based at least partly on the reference point, and apply the timing offset to the one or more first antenna panels.

According to another aspect, there is provided an apparatus comprising means for: selecting a reference point associated with a position of the apparatus, determining a timing offset associated with one or more first antenna panels, wherein the timing offset is determined based at least partly on the reference point, and applying the timing offset to the one or more first antenna panels.

According to another aspect, there is provided a system comprising at least a terminal device and one or more base stations; wherein the terminal device is configured to: select a reference point associated with a position of the terminal device; determine a timing offset associated with one or more first antenna panels, wherein the timing offset is determined based at least partly on the reference point; apply the timing offset to the one or more first antenna panels; and transmit at least one signal to the one or more base stations via the one or more first antenna panels by using the timing offset; and wherein the one or more base stations are configured to: receive the at least one signal.

According to another aspect, there is provided a system comprising at least a terminal device and one or more base stations; wherein the terminal device comprises means for: selecting a reference point associated with a position of the terminal device; determining a timing offset associated with one or more first antenna panels, wherein the timing offset is determined based at least partly on the reference point; applying the timing offset to the one or more first antenna panels; and transmitting at least one signal to the one or more base stations via the one or more first antenna panels by using the timing offset; and wherein the one or more base stations comprise means for: receiving the at least one signal.

According to another aspect, there is provided a method comprising selecting, by a terminal device, a reference point associated with a position of the terminal device; determining, by the terminal device, a timing offset associated with one or more first antenna panels, wherein the timing offset is determined based at least partly on the reference point; and applying, by the terminal device, the timing offset to the one or more first antenna panels.

According to another aspect, there is provided a computer program comprising instructions for causing an apparatus to perform at least the following: select a reference point associated with a position of the apparatus, determine a timing offset associated with one or more first antenna panels, wherein the timing offset is determined based at least partly on the reference point, and apply the timing offset to the one or more first antenna panels.

According to another aspect, there is provided a computer readable medium comprising program instructions for causing an apparatus to perform at least the following: select a reference point associated with a position of the apparatus, determine a timing offset associated with one or more first antenna panels, wherein the timing offset is determined based at least partly on the reference point, and apply the timing offset to the one or more first antenna panels.

According to another aspect, there is provided a non-transitory computer readable medium comprising program instructions for causing an apparatus to perform at least the following: select a reference point associated with a position of the apparatus, determine a timing offset associated with one or more first antenna panels, wherein the timing offset is determined based at least partly on the reference point, and apply the timing offset to the one or more first antenna panels.

BRIEF DESCRIPTION OF THE DRAWINGS

In the following, various exemplary embodiments will be described in greater detail with reference to the accompanying drawings, in which

FIGS. 10-12 illustrate flow charts according to some exemplary embodiments;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
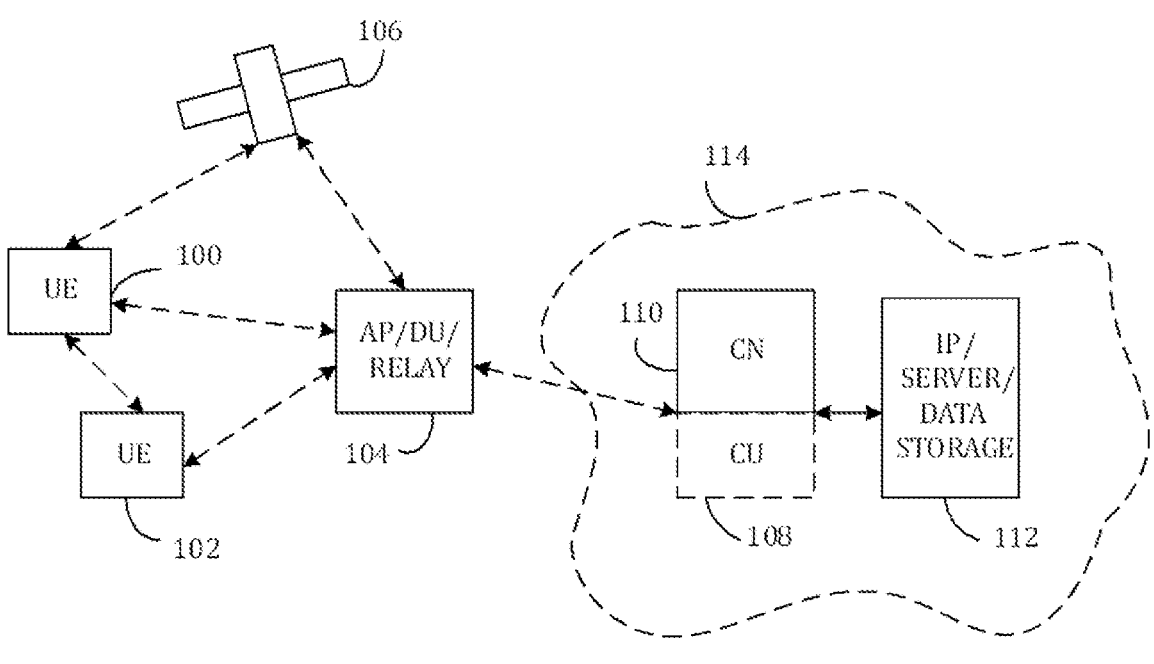
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the same infrastructure to run services that have different requirements on latency, reliability, throughput and mobility.

The current architecture in LTE networks may be fully distributed in the radio and fully centralized in the core network. The low latency applications and services in 5G may require to bring the content close to the radio which leads to local break out and multi-access edge computing (MEC). 5G may enable analytics and knowledge generation to occur at the source of the data. This approach may require leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g) nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be required to provide such a network structure.

For fulfilling the need for improving the deployment and performance of communication systems, the concept of "plug-and-play" (e/g)NodeBs may be introduced. A network which may be able to use "plug-and-play" (e/g) Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

For example, the following positioning solutions may be used in NR: downlink time difference of arrival, DL-TDOA, uplink time difference of arrival, UL-TDOA, downlink angle of departure, DL-AoD, uplink angle of arrival, UL-AoA, and/or multi-cell round trip time, multi-RTT. The solutions may enable radio access technology, RAT, dependent NR positioning for frequency ranges FR1 and FR2, and/or RAT independent NR positioning. In the downlink, a positioning reference signal, PRS, may be used, and in the uplink a sounding reference signal for positioning, SRS-for-positioning, may be used. Multi-RTT may be based on both uplink and downlink measurements and/or signals. UL-TDOA and multi-RTT may be based on SRS-for-positioning transmissions from the UE, which are measured at one or more gNBs and/or transmit and reception points, TRP. Some use cases, such as IoT, may require high positioning accuracy, for example horizontal and vertical, low latency, network efficiency, for example scalability and reference signal overhead, and/or device efficiency, for example low power consumption and complexity.

In timing-based positioning, the time of arrival, ToA, may be estimated based on the distance that the signal travels between the UE and gNB or TRP antennas. UL-timing based positioning techniques, such as UL-TDOA and multi-RTT, may require UL transmissions of SRS-for-positioning. Multiple gNBs may need to receive the SRS-for-positioning to make measurements, and multiple SRS-for-positioning resources may be used in some cases. In order to enable transmissions from the UE toward neighboring gNBs, the network, for example the serving gNB, may configure spatialRelationInfo with reference signals from neighboring gNBs. In other words, each SRS-for-positioning resource may be beamformed to a particular neighboring cell. Therefore, it may be assumed that each SRS-for-positioning resource corresponds to one target gNB or TRP in FR2, where beamforming is needed to overcome the higher pathloss. The UE may comprise multiple antenna panels, and the UE may use different panels for different SRS-for-positioning resource transmissions within one positioning fix. An antenna panel may also be referred to as an antenna array.

In some positioning-related use cases, such as the industrial internet of things, IioT, positioning accuracies of less than 20 cm may be required, which may be similar to the size of a UE. Some use cases may even require less than 10 cm positioning accuracy. When targeting such high accuracies, performing SRS-for-positioning transmissions across multiple UE antenna panels may become problematic. The distance difference between SRS-for-positioning transmissions from different antenna panels may cause relative time of arrival, RTOA, estimation errors.

Figure 2:
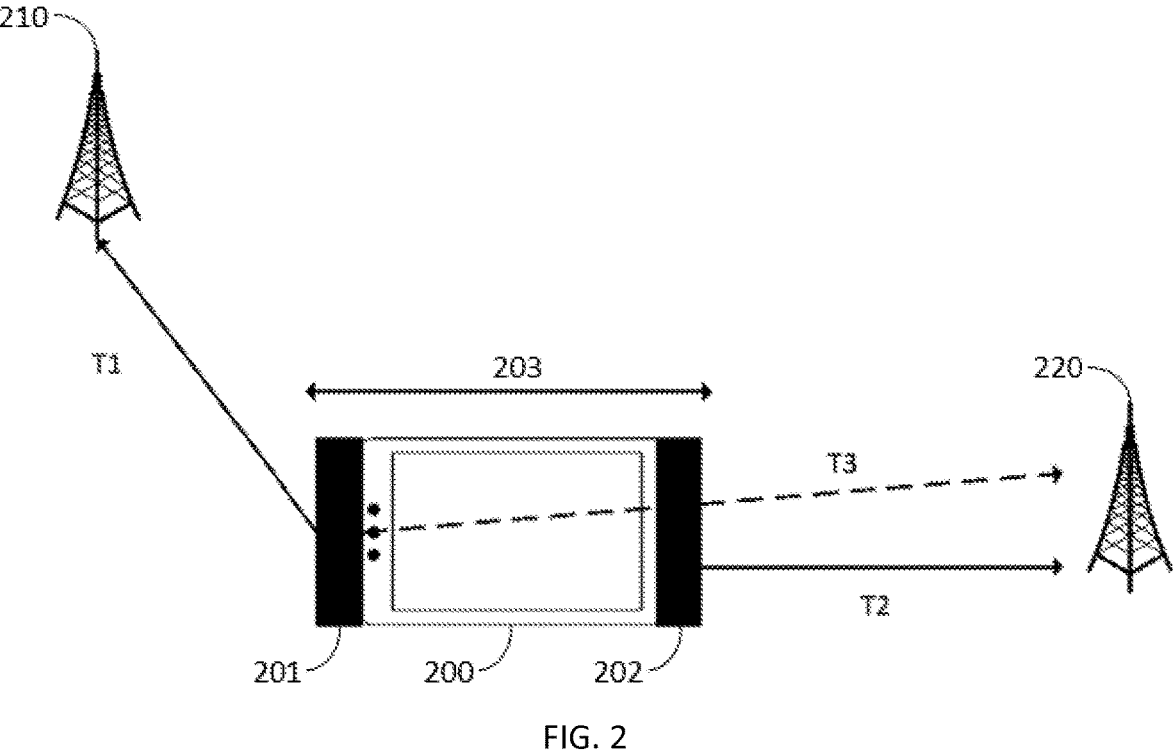
FIG. 2 illustrates an exemplary scheme, where a UE is transmitting SRS-for-positioning towards two gNBs for RTOA estimation.

FIG. 2 illustrates an exemplary scheme, where a UE 200 is transmitting SRS-for-positioning towards two gNBs 210, 220 for RTOA estimation. If a first antenna panel 201 is used for both SRS-for-positioning transmissions, then RTOA_1=T1−T3, where RTOA_1 denotes a first RTOA value, T1 denotes the time of arrival of the transmission from the first antenna panel 201 to the first gNB 210, and T3 denotes the time of arrival of the transmission from the first antenna panel to the second gNB 220. If the first antenna panel 201 is used for one SRS-for-positioning transmission and the second antenna panel 202 is used for the other SRS-for-positioning transmission, then RTOA_2=T1−T2, where RTOA_2 denotes a second RTOA value, and T2 denotes the time of arrival of the transmission from the second antenna panel 202 to the second gNB 220. If the distance 203 between the antenna panels is for example 10 cm, then there may be approximately a 0.3 ns difference between RTOA_1 and RTOA_2. This may not meet the accuracy requirements for some use cases without any other errors being modeled. Some exemplary embodiments may address this problem by improving positioning accuracy.

Figure 3:
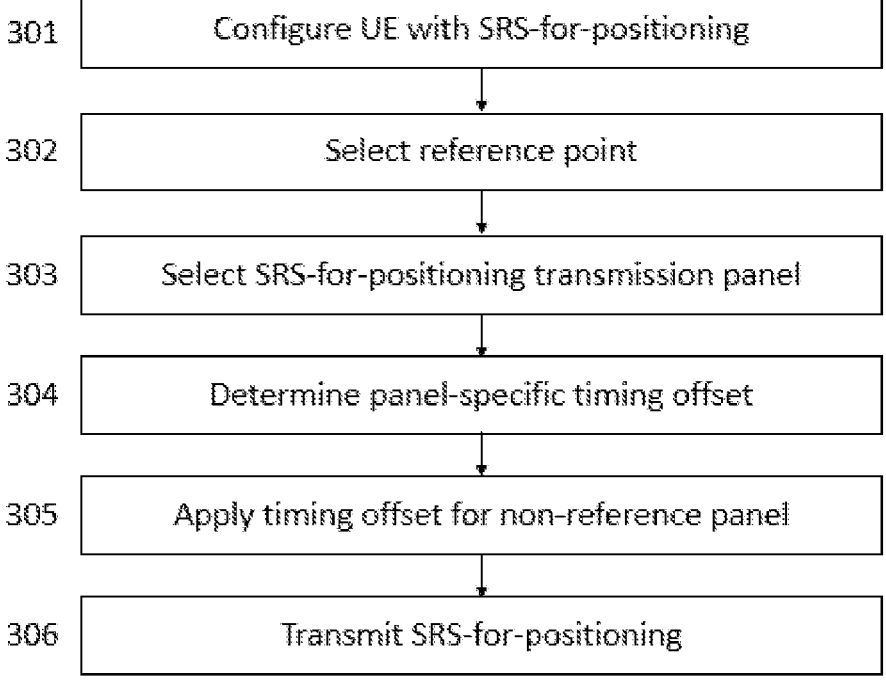
FIG. 3 illustrates a flow chart according to an exemplary embodiment.

FIG. 3 illustrates a flow chart according to an exemplary embodiment, which may be used to prevent, or reduce, positioning error caused due to SRS-for-positioning transmissions by multiple antenna panels. Referring to FIG. 3, a UE is configured 301 for SRS-for-positioning transmission towards a plurality of cells, for example as part of UL-TDOA or multi-RTT. Each cell in the plurality of cells may have a dedicated SRS-for-positioning resource intended for it. For example, each cell in the plurality of cells may have a configured spatial relation reference signal in an SRS resource. The SRS-for-positioning resources may belong to the same SRS resource set and may apply time division multiplexing, TDM. However, it should be noted that this exemplary embodiment may be applied to any scheme, where multiple antenna panels are used for SRS-for-positioning transmission.

The UE then selects 302 a reference point. The reference point may be, for example, the center of an antenna panel or any other three-dimensional physical point comprised in the UE, for example if tracking a specific point on a vehicle or robot. In other words, the reference point does not need to be comprised in the antenna panels. However, if the reference point is comprised in an antenna panel, then that antenna panel may be referred to as a reference antenna panel. For example, an antenna panel that is used for a serving gNB transmission, for example using spatialRelationInfo or the beam and/or antenna panel used for the data connection, may be selected as the reference antenna panel. The reference point may also be located outside of the UE.

The UE then selects 303 one or more antenna panels for the SRS-for-positioning transmission. The one or more antenna panels may be selected such that they form a beam in the direction of the estimated angle of arrival.

When the UE needs to transmit SRS-for-positioning resources from more than one antenna panel, it determines 304, or calculates, the necessary timing offset of each non-reference antenna panel, i.e. each antenna panel other than the reference antenna panel that are used for transmitting SRS-for-positioning resources. If the reference point is located outside of any antenna panel, i.e. there is no reference antenna panel as such, then the timing offset may be determined for all antenna panels comprised in the UE that are used for transmitting SRS-for-positioning resources. The UE may use orientation angle, distance between antenna panels or distance between the reference point and an antenna panel, and/or direction of one or more gNBs to determine the timing offset. The direction of the serving gNB may be obtained for example by angle of arrival estimation used by the downlink reference signal, or by assuming that the center of the transmit beam from the reference panel is pointing at the serving gNB. To prevent errors in the procedure, a threshold for angles may be used to prevent over-corrections.

The UE then applies 305 the determined timing offset for each non-reference antenna panel used to transmit an SRS-for-positioning resource. The timing offset may be applied by adjusting the timing of the transmission from each non-reference antenna panel, for example by advancing the timing of the transmission by the determined timing offset. The timing offset may be assumed to be quite small, for example smaller than a cyclic prefix, CP, so that there are no synchronization or time alignment issues introduced by applying this offset at the UE side. Panel difference timing errors may be removed prior to RTOA measurement. The UE then transmits 306 the SRS-for-positioning resources to the one or more gNBs. The SRS-for-positioning resources may be transmitted via one or more non-reference antenna panels by applying the associated timing offset determined for each non-reference antenna panel. SRS-for-positioning resources may also be transmitted via the reference antenna panel without any timing offset, if a reference antenna panel is used. For example, a first antenna panel may transmit an SRS-for-positioning resource to a first gNB, and a second antenna panel may transmit an SRS-for-positioning resource to a second gNB. The transmissions via multiple antenna panels may occur close in time, for example within a few slots of each other. Uplink timing may be estimated on SRS resources at each gNB and reported to a location management function, LMF, from each gNB. An LMF may be implemented in a core network or inside the RAN, where it may be referred to as a local location management function, LMC.

It should be noted that the above described exemplary embodiment may be applied to any number of UE antenna panels, and the timing offset may be applied to each non-reference antenna panel used to transmit SRS-for-positioning.

In some exemplary embodiments, multiple transmissions may be transmitted by applying the timing offset, wherein at least one transmission is transmitted to a reference base station, for example a serving base station, and at least one other transmission is transmitted to one or more different base stations.

Figure 4:
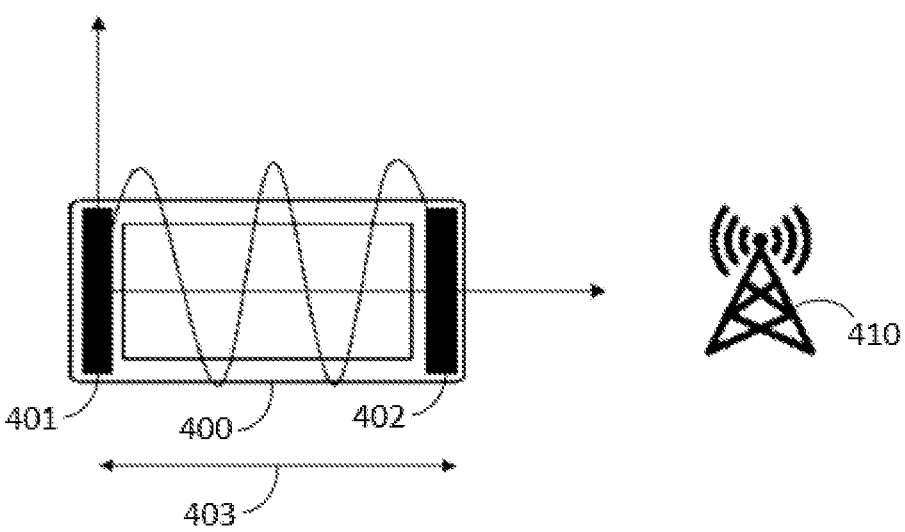
FIG. 4 illustrates an example of multi-panel transmission time difference according to an exemplary embodiment.

FIG. 4 illustrates an example of multi-panel transmission time difference according to an exemplary embodiment, wherein a UE 400 is transmitting to a gNB 410 on the horizontal axis. The UE may comprise a first antenna panel 401 and a second antenna panel 402 with a distance 403, denoted as d, between the antenna panels. A wave $s(t)=a \cos(\omega_c t + \phi_0)$ transmitted from the first antenna panel may take $$\tau = \frac{d}{c}$$

seconds to arrive at the second antenna panel. At the second antenna panel, the signal may be:

$$y(t) = s(t + \tau) = a \cos(\omega_c t + \omega_c \tau + \phi_0) = s(t) \cos\left(\frac{\omega_c d}{c}\right)$$

where d is the distance between the antenna panels, c is the velocity of light, $\tau$ is the time that it takes for the wave to arrive at the second antenna panel from the first antenna panel, s is the signal of interest, t is a time sample, $\alpha$ is the amplitude, $\omega_c$ is the carrier frequency, and $\phi_0$ is the initial phase.

Figure 5:
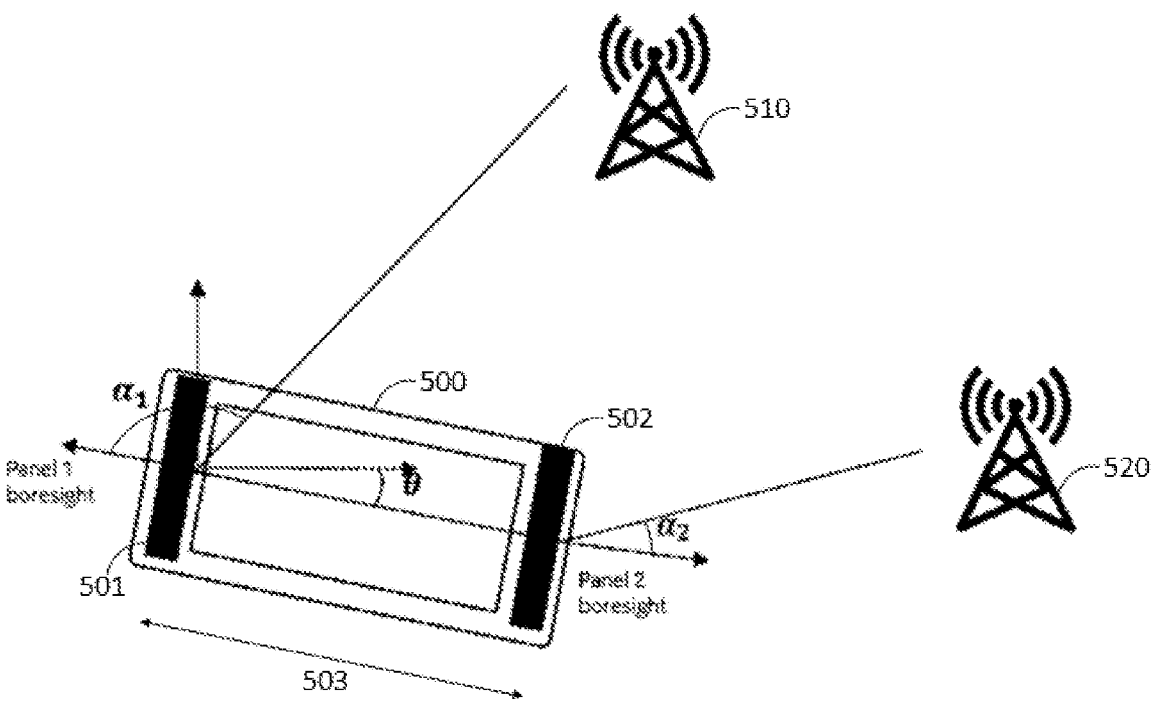
FIG. 5 illustrates an example of using angles of departure to calculate the timing offset between antenna panel transmissions according to an exemplary embodiment.

FIG. 5 illustrates an example of using angles of departure to calculate the timing offset between antenna panel transmissions according to an exemplary embodiment. A UE 500 uses a first antenna panel 501 for transmission to a first gNB 510, and the first antenna panel is selected as the reference panel. A second antenna panel 502 may be used for transmission to a second gNB 520. The UE may then use the orientation angle $\theta$, the beam steering angles $\alpha_1$ and $\alpha_2$ relative to the panel boresight, and the distance 503, denoted as d, between the antenna panels to determine the timing offset needed. The goal of this exemplary embodiment may be such that the gNBs, which receive the SRS-for-positioning, perceive the signal as if they were transmitted from the same point on the UE, i.e. from the reference panel or reference point. This way, the timing offsets may be transparent from the network side.

Figure 6:
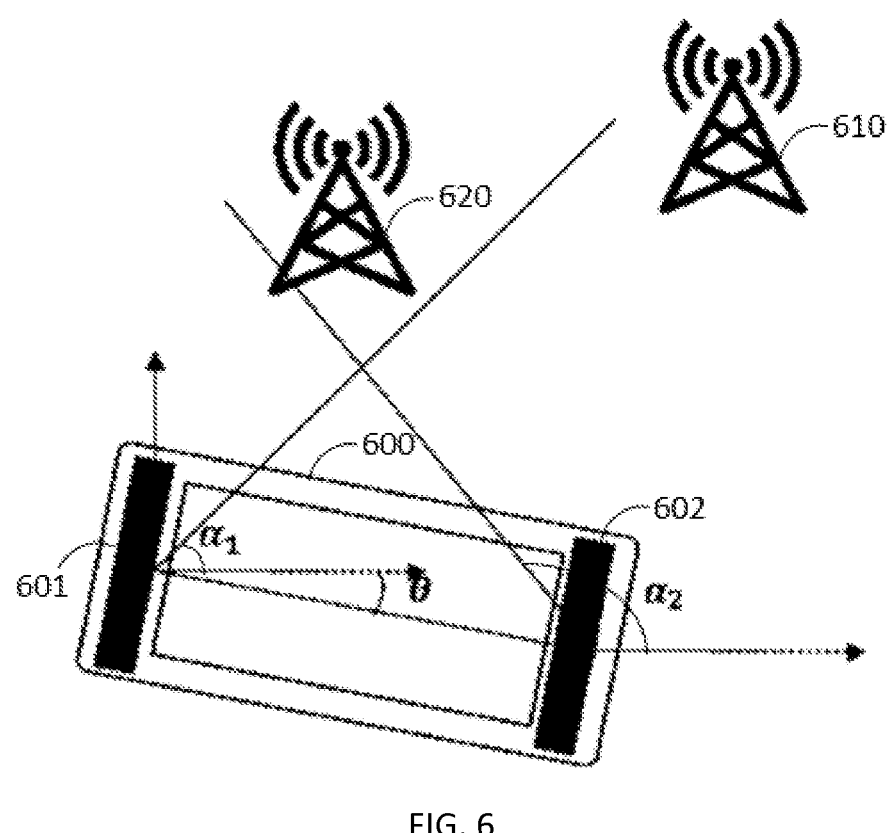
FIG. 6 illustrates an exemplary scheme for a corner error case.

FIG. 6 illustrates an exemplary scheme for a corner error case that may be avoided by thresholding the angle difference according to an exemplary embodiment. A UE 600 uses a first antenna panel 601 for transmission to a first gNB 610, and the first antenna panel may be selected as the reference panel. FIG. 6 shows an error case where it may not make sense to apply an additional offset at the second antenna panel 602. In this situation, the second antenna panel 602 would likely not be selected for transmission to the second gNB 620. If it is selected, thresholds of angles may be used to determine that the additional offset should not be applied here. Thus, the offset may be applied only when the angles $\alpha_1$ and $\alpha_2$ are within the threshold to ensure that the corner error case does not occur. The orientation angle is denoted as $\theta$.

Figure 7:
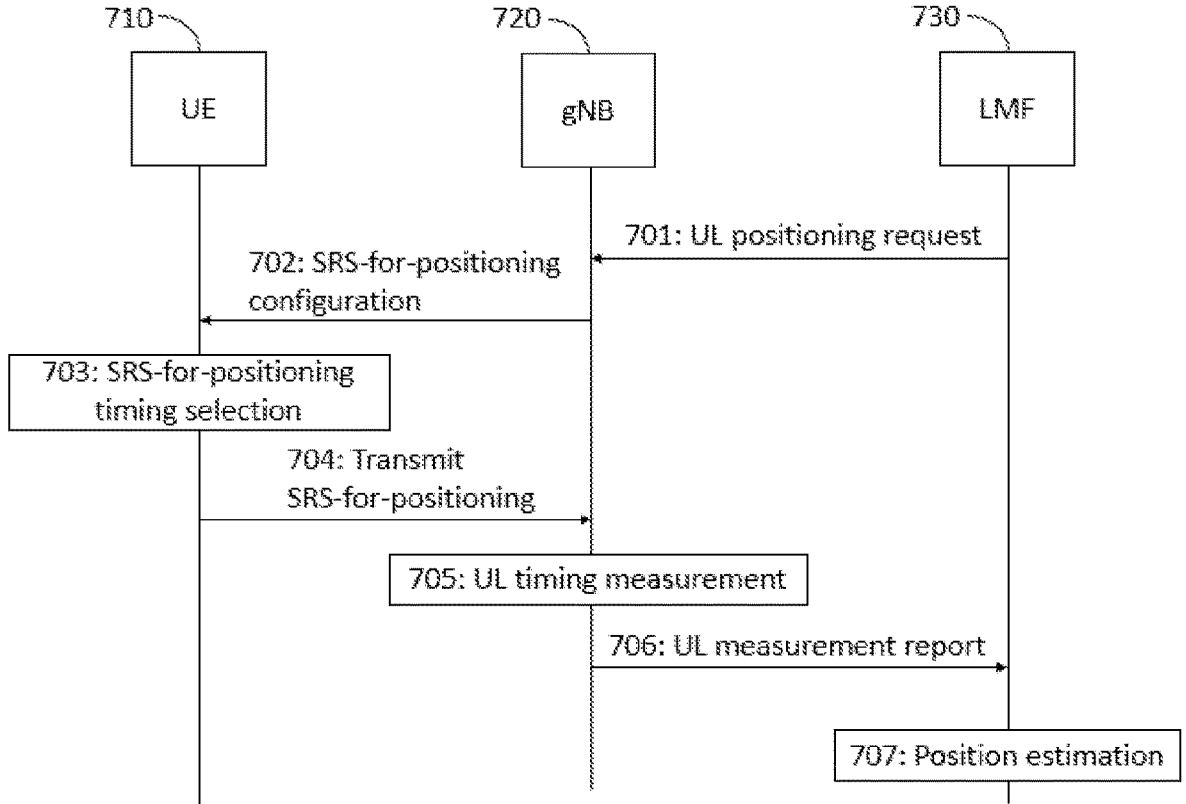
FIG. 7 illustrates a signalling diagram according to an exemplary embodiment.

FIG. 7 illustrates a signalling diagram according to an exemplary embodiment. Referring to FIG. 7, a location management function, LMF, 730 transmits 701 an uplink positioning request to one or more gNBs 720. The one or more gNBs then transmit 702 an SRS-for-positioning configuration to a UE 710. In other words, each serving gNB configures the SRS-for-positioning for their own users. The UE then performs 703 SRS-for-positioning timing selection for example according to the exemplary embodiment illustrated in FIG. 3. to instruct how the UE should transmit the SRS-for-positioning needed for an implementation of multi-RTT or UL-TDOA positioning features. The UE then transmits 704 one or more SRS-for-positioning transmissions to the one or more gNBs. The one or more gNBs the measure 705 an uplink timing on the received one or more SRS-for-positioning transmissions. The uplink timing may be measured by ToA estimators based on cross-correlation or auto-correlation techniques applied onto the received signal. The one or more gNBs then transmit 706 an uplink measurement report to the LMF based on the uplink timing measurement. The LMF then estimates 707 the position of the UE based on the received uplink measurement report(s). For example, the LMF may corroborate the ToA estimates received from multiple gNBs and use for example a least squares algorithm to estimate the UE position.

In another exemplary embodiment, the physical dimensions of the UE may be provided to the LMF instead of the timing offset(s) in order to enable the LMF to account for the position together with reference signals for the antenna panel(s).

Figure 8:
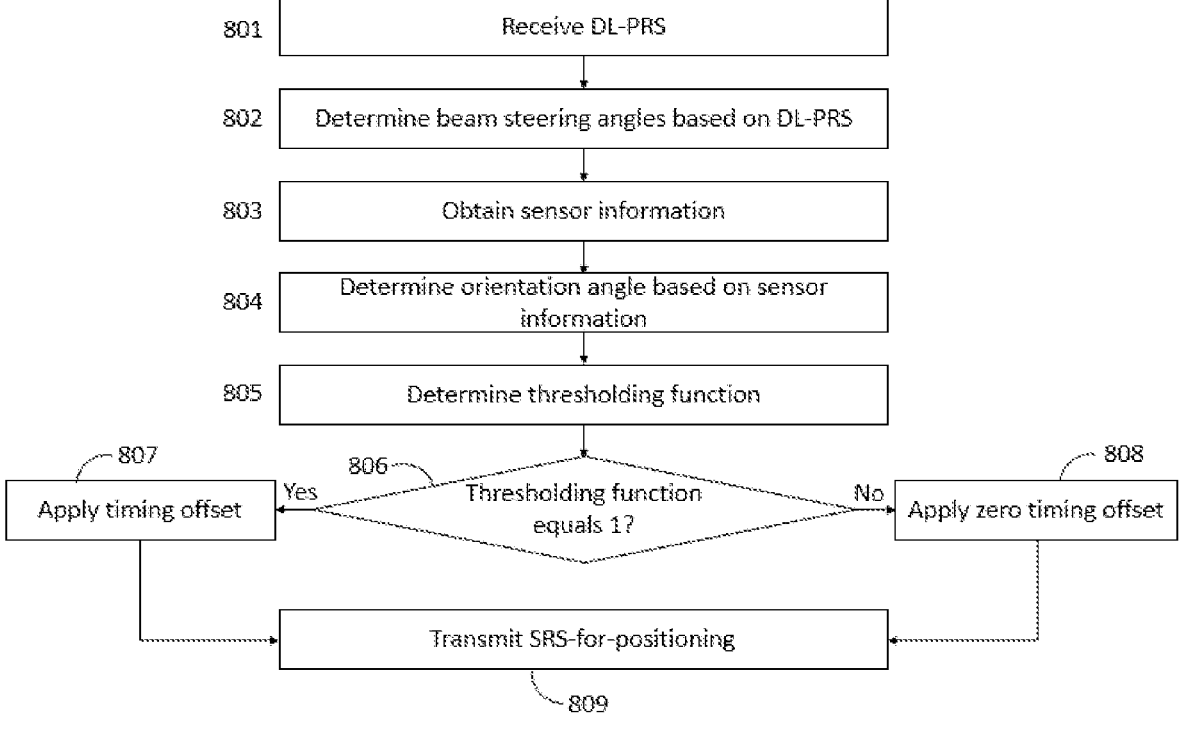
FIG. 8 illustrates a flow chart according to an exemplary embodiment.

FIG. 8 illustrates a flow chart according to an exemplary embodiment. This flow chart describes determining the panel-specific timing offset according to block 304 of FIG. 3 in more detail. A UE comprising two antenna panels is used here as a non-limiting example, but it should be noted that any number of antenna panels may be used.

Referring to FIG. 8, the UE receives 801 a downlink positioning reference signal, DL-PRS, from a base station. The DL-PRS may be received on a first antenna panel and a second antenna panel of the UE. The first antenna panel may be a reference antenna panel, and the second antenna panel may be a non-reference antenna panel. The UE then determines 802 a first beam steering angle, $\alpha_1$, associated with the first antenna panel, and a second beam steering angle, $\alpha_2$, associated with the second antenna panel based on the received DL-PRS. The beam steering angles may also be referred to as beamforming angles of departure. The angles of departure may be determined for example by an algorithm based on angle of arrival estimation on DL-PRS and channel reciprocity to determine the angle of departure for SRS-for-positioning.

The UE then obtains 803 sensor information from one or more internal sensors of the UE, and determines 804 the orientation angle, θ, of the UE based on the sensor information. An algorithm may be used to determine the orientation angle. The one or more internal sensors may also provide the orientation angle directly.

The UE then determines 805 a binary thresholding function, f, which may use as input the beamforming angles of departure, $\alpha_1$, $\alpha_2$, of the SRS-for-positioning relative to the antenna panel boresight transmitted, and the orientation angle θ of the UE. As a non-limiting example, the thresholding function may be defined as:

$$f = \begin{cases} 0, & \text{if } |\alpha_1 - \alpha_2| < \epsilon \text{ and } \theta > \dfrac{\pi}{2}, \\ 1, & \text{otherwise} \end{cases}$$

where $\epsilon$ denotes a dissimilarity degree between the two transmission angles, for example $$\epsilon = \frac{\pi}{9}$$

or any integer multiple of the codebook resolution.

It is then evaluated 806 if the thresholding function equals 1. If the thresholding function is equal to 1 (806: yes), a timing offset of $$d\frac{|\cos(\alpha_2)|}{c}$$

is calculated and applied 807 for the non-reference antenna panel transmission, where d denotes the distance between the reference antenna panel and the non-reference antenna panel, or the distance between the reference point and the non-reference antenna panel, c denotes the velocity of light, and cos denotes the mathematical cosine function. For example, the first antenna panel may be the reference antenna panel, and the second antenna panel may be the non-reference antenna panel.

If the thresholding function does not equal 1 (806: no), zero timing offset is applied 808 to the non-reference antenna panel transmission, i.e. no timing offset is applied to the non-reference antenna panel transmission.

The UE then transmits 809 SRS-for-positioning to the base station via the first antenna panel, i.e. the reference antenna panel, and the second antenna panel, i.e. the non-reference antenna panel.

It should be noted that SRS-for-positioning is used herein as a non-limiting example of a reference signal for positioning, to which some exemplary embodiments may be applied. Some exemplary embodiments may be applied to any other reference signal used for positioning.

Figure 9:
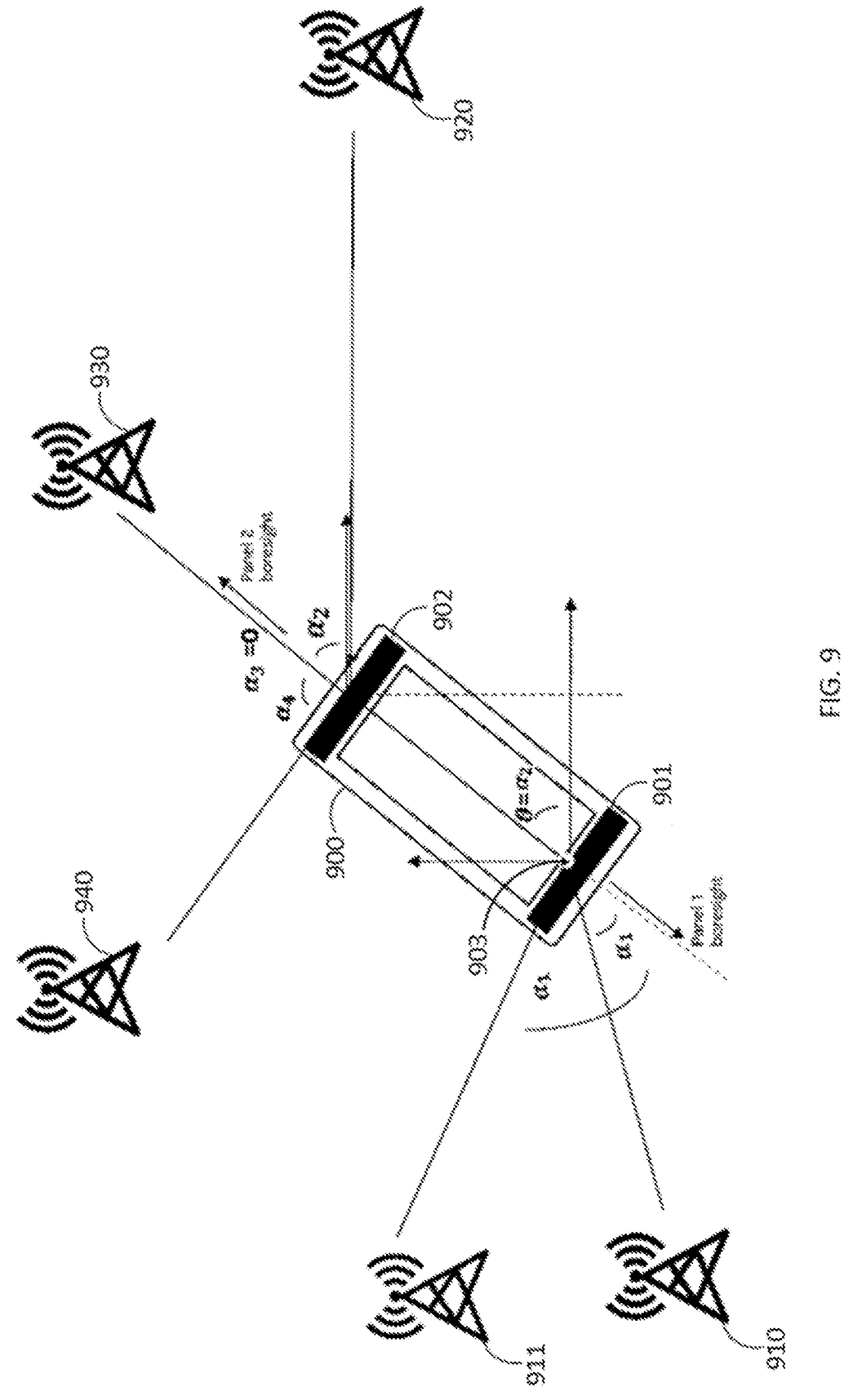
FIG. 9 illustrates an example of panel-specific timing offset calculation.

FIG. 9 illustrates an example of panel-specific timing offset calculation based on a reference point 903 according to an exemplary embodiment. The UE positioning reference point 903, or reference panel, may be selected based on the serving gNB, i.e. a first gNB 910. The serving gNB may also change such that another gNB 911 becomes the serving gNB, or the orientation of the UE with regard to the serving gNB may change. The UE 900 comprises a first antenna panel 901 and a second antenna panel 902. The timing offsets applied for transmissions to a second gNB 920, a third gNB 930, and a fourth gNB 940 may be calculated using the procedure described above for FIG. 8. θ denotes the orientation angle, $\alpha_1$ denotes the beam steering angle for the first gNB 910 relative to the panel boresight, $\alpha_2$ denotes the beam steering angle for the second gNB 920 relative to the panel boresight, $\alpha_3$ denotes the beam steering angle for the third gNB 930 relative to the panel boresight, and $\alpha_4$ denotes the beam steering angle for the fourth gNB 940 relative to the panel boresight.

FIG. 10 illustrates a flow chart according to an exemplary embodiment. The functions illustrated in FIG. 10 may be performed for example by an apparatus such as a terminal device, or an apparatus comprised in a terminal device. A terminal device may also be referred to as a UE. Referring to FIG. 10, a reference point associated with a physical position of the apparatus is selected 1001. A timing offset associated with one or more first antenna panels is determined 1002, wherein the timing offset is determined based at least partly on the reference point. The one or more first antenna panels may also be referred to as non-reference antenna panels. The determined timing offset is applied 1003 to the one or more first antenna panels.

FIG. 11 illustrates a flow chart according to an exemplary embodiment, which may continue the process from FIG. 10. Referring to FIG. 11, a plurality of sounding reference signals for positioning are transmitted 1101 via the one or more first antenna panels by using the timing offset, wherein each sounding reference signal for positioning is configured with a different spatial relation.

FIG. 12 illustrates a flow chart according to an exemplary embodiment, wherein a UE may report a capability to use a timing offset for one or more antenna panels for example to one or more base stations and/or to an LMF. In other words, the UE may report a capability to compensate multi-panel timing delays as a UE capability, for example by transmitting an indication of such a capability to an LMF during capability reporting. As a non-limiting example, a short message indicator, SMI, may be used to indicate the UE capability. Referring to FIG. 12, a capability to use a timing offset associated with one or more antenna panels is reported 1201 to one or more base stations and/or to a location management function.

The functions and/or blocks described above by means of FIGS. 3, 7, 8, 10, 11 and 12 are in no absolute chronological order, and some of them may be performed simultaneously or in an order differing from the described one. Other functions and/or blocks may also be executed between them or within them.

A technical advantage provided by some exemplary embodiments may be that they may improve positioning accuracy by correcting timing estimation errors caused by SRS-for-positioning signals traveling different distances due to transmissions from multiple antenna panels. Some exemplary embodiments may be used to implement uplink positioning features, such as UL-TDOA and multi-cell RTT. However, it should be noted that some exemplary embodiments are not limited to UL-TDOA and multi-RTT, as some exemplary embodiments may be used for any timing based scheme or hybrid positioning scheme. Furthermore, some exemplary embodiments may be used for example for any uplink indoor positioning deployment, such as a factory where a high positioning accuracy may be required for example for automated guided vehicles, AGVs, moving on the factory floor. Another possible use case may be vehicle-to-everything, V2X, positioning.

Figure 13:
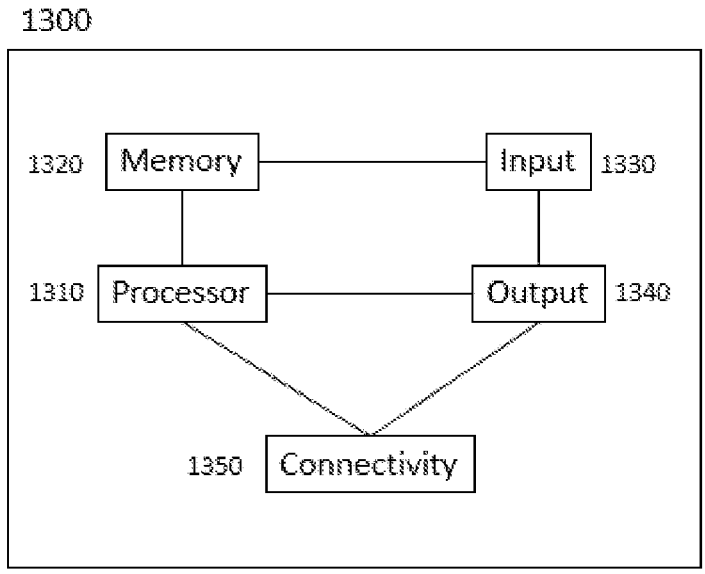
FIGS. 13-14 illustrate apparatuses according to exemplary embodiments.

FIG. 13 illustrates an apparatus 1300, which may be an apparatus such as, or comprised in, a terminal device, according to an exemplary embodiment. A terminal device may also be referred to as a UE. The terminal device may be, for example, a mobile phone, a smartphone, a tablet computer, a laptop computer, a robot, a vehicle, or any other device comprising at least two antenna panels. The apparatus 1300 comprises a processor 1310. The processor 1310 interprets computer program instructions and processes data. The processor 1310 may comprise one or more programmable processors. The processor 1310 may comprise programmable hardware with embedded firmware and may, alternatively or additionally, comprise one or more application specific integrated circuits, ASICs.

The processor 1310 is coupled to a memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1320 stores computer readable instructions that are executed by the processor 1310. For example, non-volatile memory stores the computer readable instructions and the processor 1310 executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1300 may further comprise, or be connected to, an input unit 1330. The input unit 1330 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1330 may comprise an interface to which external devices may connect to.

The apparatus 1300 may also comprise an output unit 1340. The output unit may comprise or be connected to one or more displays capable of rendering visual content such as a light emitting diode, LED, display, a liquid crystal display, LCD and a liquid crystal on silicon, LCoS, display. The output unit 1340 may further comprise one or more audio outputs. The one or more audio outputs may be for example loudspeakers.

The apparatus 1300 further comprises a connectivity unit 1350. The connectivity unit 1350 enables wireless connectivity to one or more external devices. The connectivity unit 1350 comprises at least one transmitter and at least one receiver that may be integrated to the apparatus 1300 or that the apparatus 1300 may be connected to. The at least one transmitter comprises at least one transmission antenna, and the at least one receiver comprises at least one receiving antenna. The connectivity unit 1350 may comprise an integrated circuit or a set of integrated circuits that provide the wireless communication capability for the apparatus 1300. Alternatively, the wireless connectivity may be a hardwired application specific integrated circuit, ASIC. The connectivity unit 1350 may comprise one or more components such as a power amplifier, digital front end, DFE, analog-to-digital converter, ADC, digital-to-analog converter, DAC, frequency converter, (de)modulator, and/or encoder/decoder circuitries, controlled by the corresponding controlling units.

It is to be noted that the apparatus 1300 may further comprise various components not illustrated in FIG. 13. The various components may be hardware components and/or software components.

Figure 14:
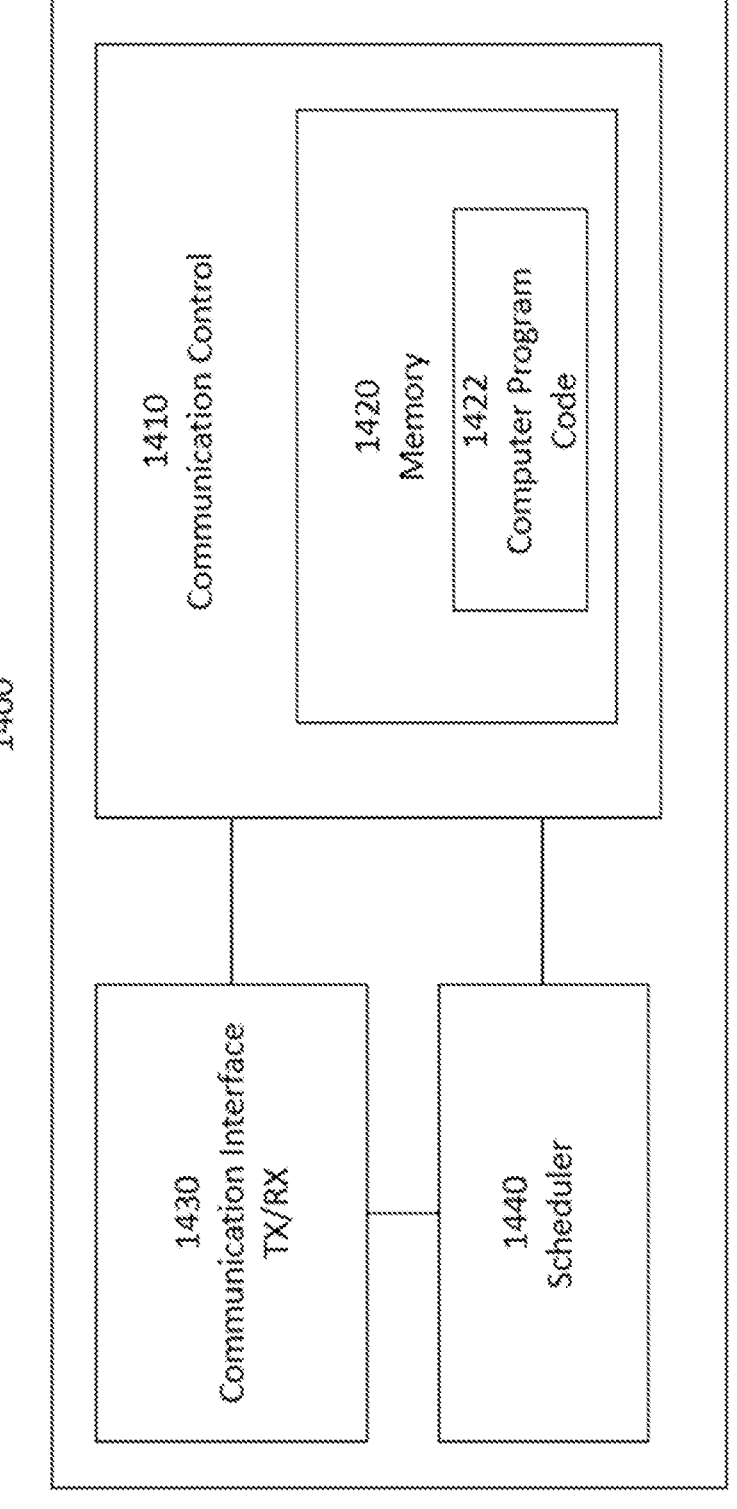

The apparatus 1400 of FIG. 14 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 1400 may be an electronic device comprising one or more electronic circuitries. The apparatus 1400 may comprise a communication control circuitry 1410 such as at least one processor, and at least one memory 1420 including a computer program code (software) 1422 wherein the at least one memory and the computer program code (software) 1422 are configured, with the at least one processor, to cause the apparatus 1400 to carry out some of the exemplary embodiments described above.

The memory 1420 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store a current neighbour cell list, and, in some exemplary embodiments, structures of the frames used in the detected neighbour cells.

The apparatus 1400 may further comprise a communication interface 1430 comprising hardware and/or software for realizing communication connectivity according to one or more communication protocols. The communication interface 1430 may provide the apparatus with radio communication capabilities to communicate in the cellular communication system. The communication interface may, for example, provide a radio interface to terminal devices. The apparatus 1400 may further comprise another interface towards a core network such as the network coordinator apparatus and/or to the access nodes of the cellular communication system. The apparatus 1400 may further comprise a scheduler 1440 that is configured to allocate resources.

As used in this application, the term "circuitry" may refer to one or more or all of the following:

a. hardware-only circuit implementations (such as implementations in only analog and/or digital circuitry) and b. combinations of hardware circuits and software, such as (as applicable):

i. a combination of analog and/or digital hardware circuit(s) with software/firmware and ii. any portions of hardware processor(s) with software (including digital signal processor(s)), software, and memory(ies) that work together to cause an apparatus, such as a mobile phone, to perform various functions) and c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. A user equipment comprising at least one processor, and at least one memory storing instructions that, when executed by the at least one processor, cause the user equipment to:
   select, by the user equipment, a reference point comprised in a second antenna panel and associated with a position of the user equipment;
   determine, by the user equipment, a timing offset associated with one or more first antenna panels, wherein the timing offset is determined based at least partly on the reference point, the one or more first antenna panels and the second antenna panel, and wherein the user equipment comprises the one or more first antenna panels and the second antenna panel; and apply, by the user equipment, the timing offset to the one or more first antenna panels.

2. The user equipment according to claim 1, wherein the user equipment is further caused to transmit at least one signal to one or more base stations via the one or more first antenna panels by using the timing offset.

3. The user equipment according to claim 2, wherein the at least one signal is a sounding reference signal for positioning.

4. The user equipment according to claim 2, wherein the timing offset is smaller than a cyclic prefix associated with the at least one signal.

5. The user equipment according to claim 1, wherein the user equipment is further caused to transmit a plurality of sounding reference signals for positioning via the one or more first antenna panels by using the timing offset, wherein each sounding reference signal for positioning is configured with a different spatial relation.

6. The user equipment according to claim 1, wherein the user equipment is further caused to report, to the one or more base stations and/or to a location management function, a capability to use the timing offset associated with the one or more first antenna panels.

7. The user equipment according to claim 1, wherein the timing offset is determined based at least partly on an orientation angle, one or more beam steering angles, a distance between the reference point and one of the one or more first antenna panels, and/or an estimated direction of the one or more base stations.

8. The user equipment according to claim 1, wherein the timing offset is determined by calculating $d*|\cos(\alpha)|/c$, wherein d is the distance between the reference point and one of the one or more first antenna panels, cos is a mathematical cosine function, $\alpha$ is a beam steering angle, and c is the velocity of light.

9. The user equipment according to claim 1, wherein the timing offset is applied, if the one or more beam steering angles are within the first pre-defined threshold.

10. The user equipment according to claim 1, wherein the timing offset is applied, if a difference between at least two of the beam steering angles is above or equal to a second pre-defined threshold, and if the orientation angle is below or equal to a third pre-defined threshold.

11. The user equipment according to claim 1, wherein the timing offset is applied to address a positioning error associated with a sounding reference signal for positioning transmission.

12. The user equipment according to claim 1, wherein the timing offset is determined based at least partly on a distance between the one or more first antenna panels and the second antenna panel.

13. A system comprising at least a user equipment and one or more base stations;
   wherein the user equipment is configured to:
   select a reference point comprised in a second antenna panel and associated with a position of the user equipment;
   determine a timing offset associated with one or more first antenna panels, wherein the timing offset is determined based at least partly on the reference point, the one or more first antenna panels and the second antenna panel, and wherein the user equipment comprises the one or more first antenna panels and the second antenna panel;
   apply the timing offset to the one or more first antenna panels; and transmit at least one signal to the one or more base stations via the one or more first antenna panels by using the timing offset; and wherein the one or more base stations are configured to:

receive the at least one signal.

14. The system according to claim 13, wherein the system further comprises a location management function;

wherein the one or more base stations are further configured to:

measure an uplink timing associated with the received at least one signal; and transmit the measured uplink timing to the location management function; and wherein the location management function is configured to:

receive the measured uplink timing from the one or more base stations; and estimate a position of the user equipment based at least partly on the measured uplink timing.

15. A method comprising:

selecting, by a user equipment, a reference point comprised in a second antenna panel and associated with a position of the user equipment;

determining, by the user equipment, a timing offset associated with one or more first antenna panels, wherein the timing offset is determined based at least partly on the reference point, the one or more first antenna panels and the second antenna panel, and wherein the user equipment comprises the one or more first antenna panels and the second antenna panel; and applying, by the user equipment, the timing offset to the one or more first antenna panels.

16. The method according to claim 15, wherein the method further comprises transmitting at least one signal to one or more base stations via the one or more first antenna panels by using the timing offset.

17. The method according to claim 16, wherein the at least one signal is a sounding reference signal for positioning.

18. The method according to claim 15, wherein the method further comprises transmitting a plurality of sounding reference signals for positioning via the one or more first antenna panels by using the timing offset, wherein each sounding reference signal for positioning is configured with a different spatial relation.

19. The method according to claim 15, wherein the method further comprises reporting, to the one or more base stations and/or to a location management function, a capability to use the timing offset associated with the one or more first antenna panels.

20. The method according to claim 15, wherein the timing offset is determined based at least partly on an orientation angle, one or more beam steering angles, a distance between the reference point and one of the one or more first antenna panels, and/or an estimated direction of the one or more base stations.

21. A non-transitory computer readable medium comprising program instructions that, when executed by user equipment, cause the user equipment to perform at least the following:

select, by the user equipment, a reference point comprised in a second antenna panel and associated with a position of the user equipment;

determine, by the user equipment, a timing offset associated with one or more first antenna panels, wherein the timing offset is determined based at least partly on the reference point, the one or more first antenna panels and the second antenna panel, and wherein the user equipment comprises the one or more first antenna panels and the second antenna panel; and apply, by the user equipment, the timing offset to the one or more first antenna panels.

* * * * *